United States Patent
Barber et al.

(10) Patent No.: US 10,380,231 B2
(45) Date of Patent: Aug. 13, 2019

(54) SYSTEM AND METHOD FOR DYNAMIC ORGANIZATION OF INFORMATION SETS

(75) Inventors: Lorrie M. Barber, Cary, NC (US); Jana H. Jenkins, Raleigh, NC (US); Julia Moulton, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2445 days.

(21) Appl. No.: 11/440,287

(22) Filed: May 24, 2006

(65) Prior Publication Data

US 2007/0277101 A1  Nov. 29, 2007

(51) Int. Cl.

| | |
|---|---|
| *G06F 17/00* | (2019.01) |
| *G06F 17/24* | (2006.01) |
| *G06F 16/38* | (2019.01) |
| *G06F 16/35* | (2019.01) |
| *G06F 3/0484* | (2013.01) |
| *G06F 3/0486* | (2013.01) |

(52) U.S. Cl.
CPC ............ *G06F 17/24* (2013.01); *G06F 3/0486* (2013.01); *G06F 3/04842* (2013.01); *G06F 16/353* (2019.01); *G06F 16/38* (2019.01)

(58) Field of Classification Search
CPC ............... G06F 17/24; G06F 17/30722; G06F 17/30707
USPC ....... 715/243, 253, 244, 245, 200, 273, 276, 715/255–256, 763
See application file for complete search history.

(56) References Cited

U.S. PATENT DOCUMENTS

| | | | | |
|---|---|---|---|---|
| 6,122,647 | A  * | 9/2000 | Horowitz .......... | G06F 17/30873 707/999.003 |
| 6,212,534 | B1 * | 4/2001 | Lo et al. ...................... | 715/205 |
| 6,457,002 | B1 * | 9/2002 | Beattie et al. .................. | 707/3 |
| 6,572,660 | B1 | 6/2003 | Okamoto ................... | 715/500.1 |
| 6,769,096 | B1 * | 7/2004 | Kuppusamy ...... | G06F 17/30014 707/999.01 |
| 7,047,487 | B1 * | 5/2006 | Bates .................. | G06F 17/2247 715/234 |
| 7,171,468 | B2 * | 1/2007 | Yeung et al. ................. | 709/225 |
| 7,191,410 | B1 * | 3/2007 | Kruempelmann et al. ... | 715/853 |

(Continued)

OTHER PUBLICATIONS

IBM's Darwin Information Typing Architecture (DITA), Cover Pages, Mar. 16, 2001, http://xml.coverpages.org/ni2001-03-16-a.html, 5 pages.*

(Continued)

*Primary Examiner* — Cesar B Paula
*Assistant Examiner* — David Faber
(74) *Attorney, Agent, or Firm* — Steven M. Greenberg, Esq.; Shutts & Bowen LLP

(57) ABSTRACT

An electronic pasteboard allows users to organize multiple documents in a single visual interface. After placing documents on the pasteboard, users can drag and drop portions (paragraphs, words, figures, images, graphs) from one document to another document, or create a new document combining elements from several source documents. Users can create tables or an index for grouping together individual documents, or elements of documents. Each original source document can be saved individually, with tags added related to the user defined groupings. The entire pasteboard with content from all the source documents can be saved or printed out. Likewise, selected groupings on the pasteboard can also be saved or printed out.

7 Claims, 6 Drawing Sheets

800

| | • CONCEPT | • TASK | • REFERENCE |
|---|---|---|---|
| • GREEN | • C1 (DOC_1)<br>• C2 (DOC_2) | • T1 (DOC_1) | • R1 (DOC_1)<br>• R2 (DOC_3) |
| • YELLOW | • C3 (DOC_3) | • T2 (DOC_2)<br>• T3 (DOC_3) | |
| • RED | | • T4 (DOC_2) | |

(56) References Cited

U.S. PATENT DOCUMENTS

| | | |
|---|---|---|
| 7,383,499 B2* | 6/2008 | Kraft et al. .................... 715/246 |
| 7,496,840 B2* | 2/2009 | Hailey et al. .................. 715/243 |
| 7,657,640 B2* | 2/2010 | Decime ................ G06Q 10/107 |
| | | 379/265.02 |
| 7,756,332 B2* | 7/2010 | Jager ............................ 382/173 |
| 2002/0052896 A1 | 5/2002 | Streit et al. ................... 707/517 |
| 2002/0059333 A1* | 5/2002 | Tribbeck ....................... 707/500 |
| 2002/0059334 A1* | 5/2002 | Jelbert .......................... 707/500 |
| 2002/0059335 A1* | 5/2002 | Jelbert .......................... 707/500 |
| 2002/0129006 A1* | 9/2002 | Emmett ........... G06F 17/30896 |
| 2002/0138529 A1* | 9/2002 | Yang-Stephens ........................... |
| | | G06F 17/30705 |
| | | 715/256 |
| 2003/0130993 A1* | 7/2003 | Mendelevitch ... G06F 17/30707 |
| 2003/0140067 A1* | 7/2003 | Sesek ................ H04N 1/32101 |
| 2003/0237091 A1 | 12/2003 | Toyama et al. .................. 725/40 |
| 2004/0044958 A1* | 3/2004 | Wolf .................... G06F 17/218 |
| | | 715/255 |
| 2004/0085355 A1* | 5/2004 | Harmes et al. ................ 345/751 |
| 2004/0123244 A1* | 6/2004 | Campbell et al. ............. 715/517 |
| 2004/0230676 A1* | 11/2004 | Spivack ............ G06F 17/30908 |
| | | 709/223 |
| 2005/0125395 A1* | 6/2005 | Boettiger .......... G06F 17/30864 |
| 2005/0149851 A1* | 7/2005 | Mittal ................ G06F 17/2235 |
| | | 715/205 |
| 2005/0183007 A1 | 8/2005 | Gaug et al. .................... 715/513 |
| 2005/0190405 A1 | 9/2005 | Tomita ......................... 358/1.18 |
| 2006/0059133 A1* | 3/2006 | Moritani .......... G06F 17/30864 |
| 2006/0173821 A1* | 8/2006 | Hennum et al. ................. 707/3 |
| 2007/0061092 A1* | 3/2007 | Meijer ............. G06F 17/30569 |
| | | 702/100 |

OTHER PUBLICATIONS

Day et al, "Introduction to the Darwin Information Typing Architecture", IBM, Sep. 28, 2005, 12 pages.*

* cited by examiner

|  | • CONCEPT | • TASK | • REFERENCE |
|---|---|---|---|
| • GREEN | • C1 (DOC_1)<br>• C2 (DOC_2) | • T1 (DOC_1) | • R1 (DOC_1)<br>• R2 (DOC_3) |
| • YELLOW | • C3 (DOC_3) | • T2 (DOC_2)<br>• T3 (DOC_3) |  |
| • RED |  | • T4 (DOC_2) |  |

SYSTEM AND METHOD FOR DYNAMIC ORGANIZATION OF INFORMATION SETS

FIELD OF THE INVENTION

The invention relates generally to computer implemented data processing, and specifically to creating a graphical user interface for simultaneously viewing multiple documents, visually moving and organizing elements from each document, and saving the changes.

BACKGROUND OF THE INVENTION

Collaborative document authoring is now more a norm than an exception in any line of business, be it technology, law, education, research or journalism. Typically, several individuals author different sections of a document based on their assigned roles and their individual area of expertise. A coordinator then merges the sections together and is responsible for the document as a whole, including overseeing the authorship of each part of the document. The coordinator's role involves a significant amount of effort in terms of tracking different versions of each section by each author, and merging the different versions of document sections into the master document.

To further complicate the process of coordinating a collaboratively authored document, there are various media and applications used in the writing process. The actual content intended for the final product often comprises different mediums or formats than that of the master document. Coordinators must capture content from each medium and format and merge the content into the master document. Because of the complex nature of collaborative document authorship, the coordinator responsible for merging the document must spend significant time and effort to track different versions of the documents received from the individual authors. Furthermore, the coordinator must exert considerable effort to carefully extract specific sections written by the appropriate authors from the correct version each document, for inclusion in the master document. There is a need for a single visual environment for efficiently creating a master document by tracking, organizing, and combining compartmentalized information from diverse sources and formats.

SUMMARY OF THE INVENTION

An electronic pasteboard allows users to organize multiple documents in a single visual interface. The pasteboard can display documents from different sources, such as MS WORD®, WORDPERFECT®, and LOTUS NOTES® simultaneously. After placing documents on the pasteboard, users can drag and drop portions (paragraphs, words, figures, images, graphs) from one document to another document, or create a new document combining elements from several source documents. Users can create tables or an index for grouping together individual documents, or elements of documents. Each original source document can be saved individually, with tags added related to the user defined groupings. The entire pasteboard with content from all the source documents can be saved or printed out. Likewise, selected groupings on the pasteboard can also be saved or printed out. One advantage of the pasteboard visual interface is that users can quickly identify and correct differences between original source documents in formatting, such as, but not limited to font, colors, text size, margins and line spacing. Extensible Markup Language, or "XML" files can be used to store the active pasteboard document to facilitate easy and accurate conversion between formats.

BRIEF DESCRIPTION OF THE DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "Electronic Pasteboard."

Figure 1:
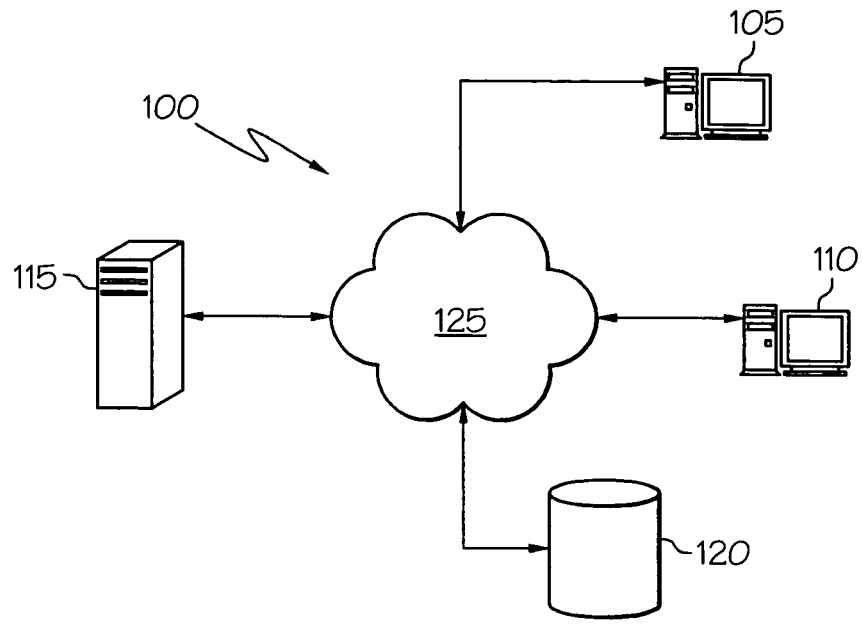
FIG. 1 depicts an exemplary computer network.

Additionally, the Electronic Pasteboard described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
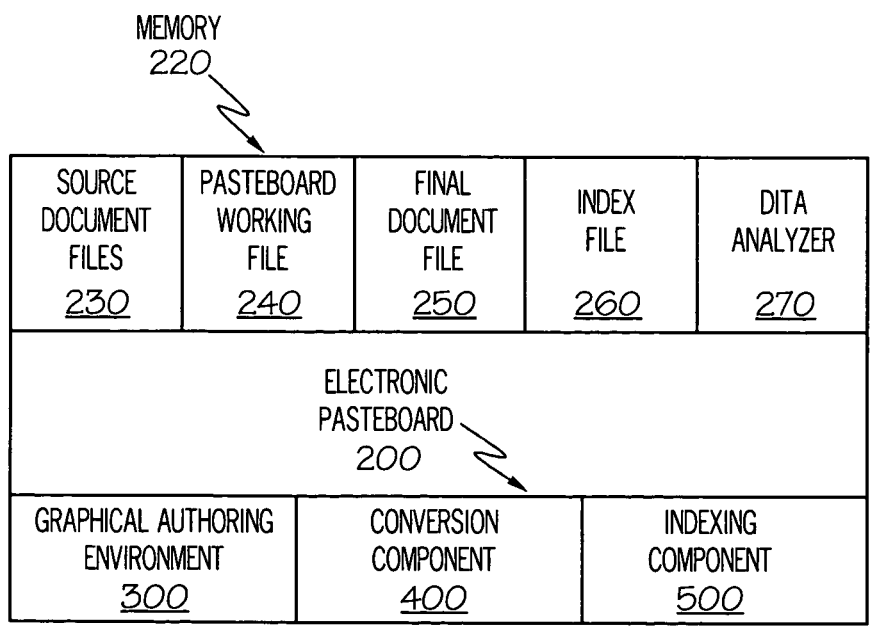
FIG. 2 depicts exemplary programs and files in a memory on a computer.

Electronic Pasteboard 200 typically is stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Thus, FIG. 2 is included merely as a descriptive expedient and does not necessarily reflect any particular physical embodiment of memory 220. As depicted in FIG. 2, though, memory 220 may include additional data and programs. Of particular import to Electronic Pasteboard 200, memory 220 may include source document files 230, pasteboard working file 240, final document file 250, index file 260, DITA analyzer 270, graphical authoring environment 300, conversion component 400 and indexing component 500 with which Electronic Pasteboard 300 interacts.

Figure 3:
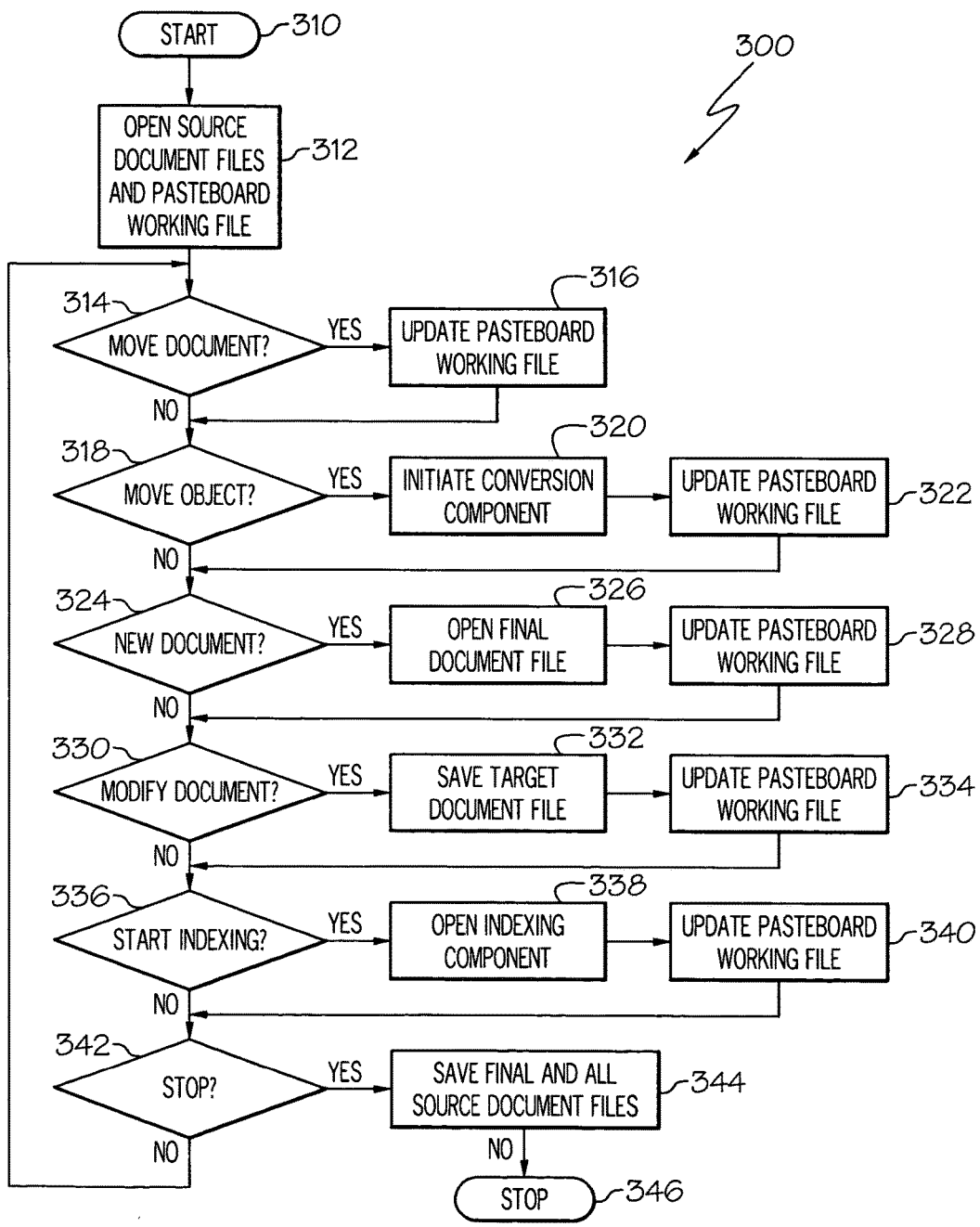
FIG. 3 depicts a flowchart of a Graphical Authoring Environment.

FIG. 3 depicts a flow chart of Graphical Authoring Environment 300. Graphical Authoring Environment 300 begins and the user opens source document files 230 and pasteboard working file 240 (312). Graphical Authoring Environment 300 makes a series of determinations based upon user input as to whether the user wants to move a document (314), move an object (318), create a new document (324), modify a document (330), start indexing (336), or stop (342). If the user elects to move a document (314), then Graphical Authoring Environment 300 updates pasteboard working file 240 (316). Pasteboard working file 240 is ideally saved in an XML format to facilitate conversion between different formats. If the user elects to move an object (318), then Graphical Authoring Environment 300 initiates conversion component 400 (see FIG. 4) (320) and updates pasteboard working file 240 (322). If the user elects to create a new document (324), then Graphical Authoring Element 300 opens final document file 250 (326) and updates pasteboard working file 240 (328). If the user elects to modify a document (330), then Graphical Authoring Element saves the target document file (332) and updates the pasteboard working file (334). If the user elects to start indexing (336), then Graphical Authoring Element 300 opens indexing component 500 (338) and updates pasteboard working file 240 (340). If the user elects to stop (342), then Graphical Authoring Element 300 saves final and all source documents files 230 (344) and stops (346). If the user does not elect to stop, Graphical Authoring Element 300 returns to step 314 and repeats the above steps.

Figure 4:
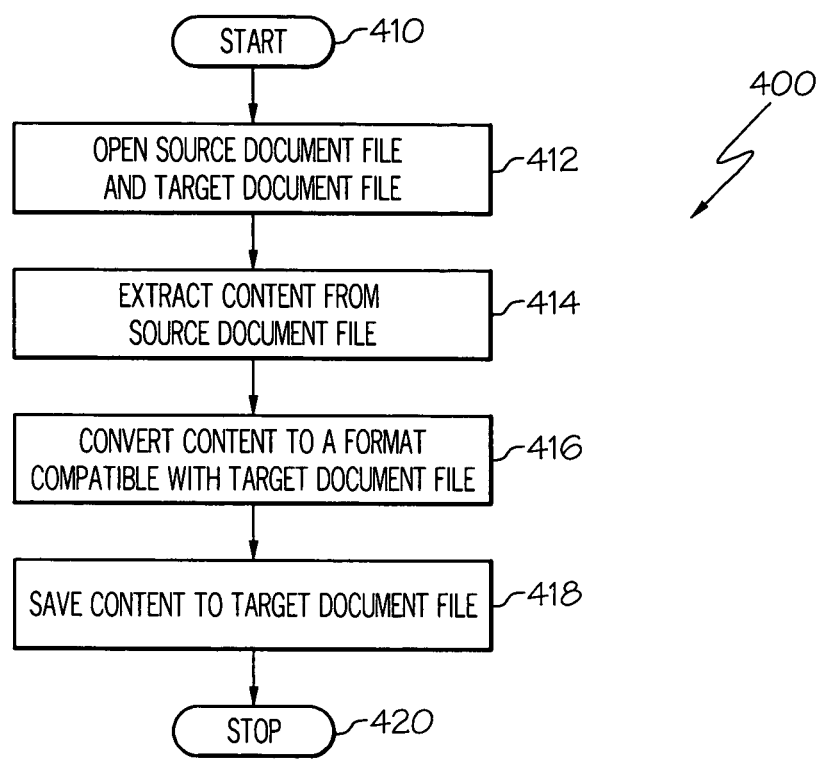
FIG. 4 depicts a flowchart of a Conversion Component.

FIG. 4 depicts conversion component 400. Conversion component 400 starts (410) and opens source document file 230 and target document file (not shown) (412). Conversion component 400, extracts content from source document file 230 (414) and converts the content extracted from the source document file 230, to a format compatible with target document file (416). Conversion component 400 then saves content to the target document file (418) and stops (420).

Figure 5:
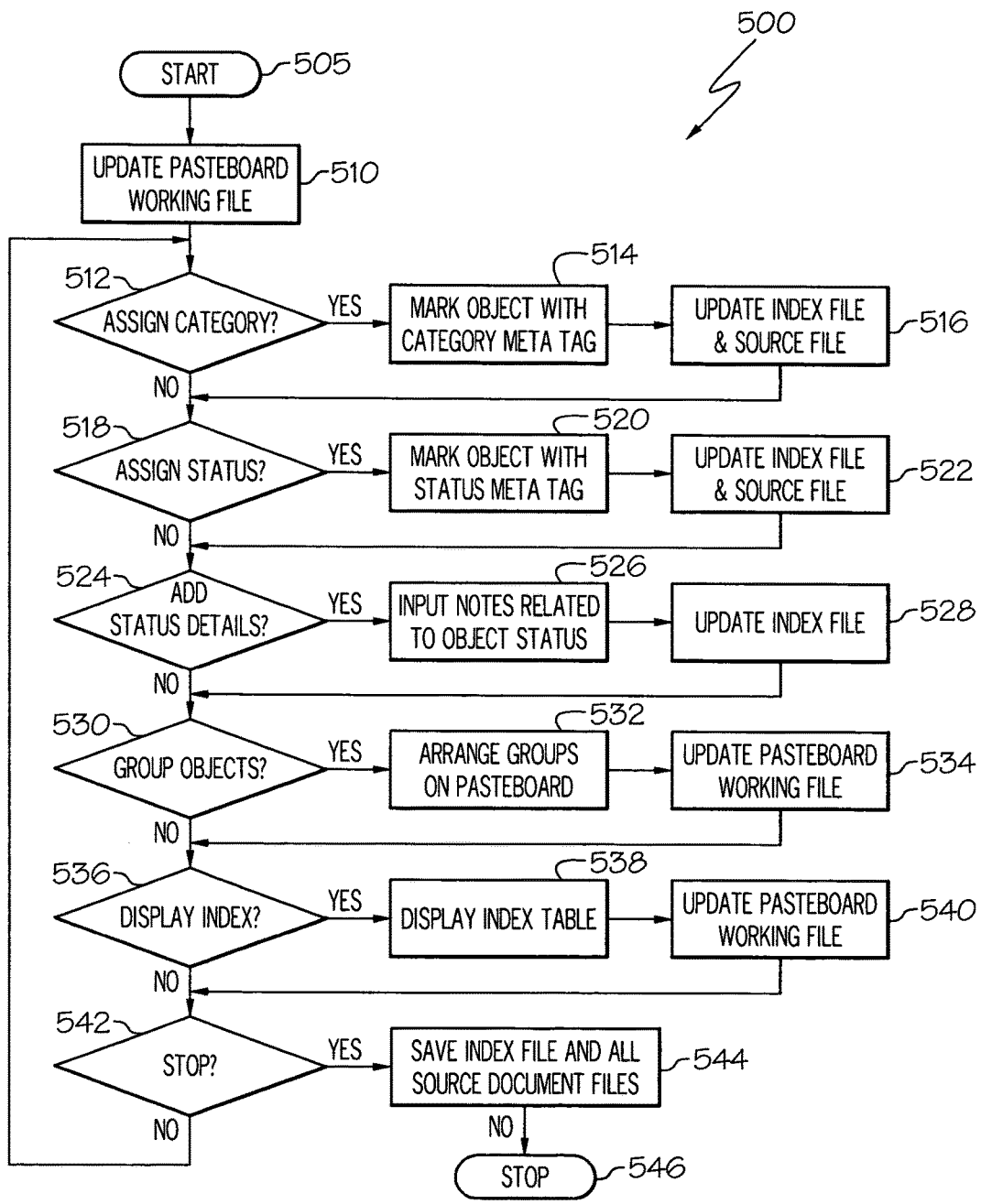
FIG. 5 depicts a flowchart of an Indexing Component.

FIG. 5 depicts the logic of indexing component 500. Indexing component 500 starts (505) and opens index file 260 (510). Indexing component 500 then makes a series of determinations as to whether the user wants to assign a category (512), assign status (518), add status details (524), group objects (530), display an index (536) or stop (542). If the user wants to assign a category (512), the conversion component 500 marks the object with category meta tag (514) and updates index file 260 and source document file 230 (516). If the user wants to assign a status (518), then conversion component 500 marks the object with a status meta tag (520) and updates index file 260 and source document file 230 (522). If the user wants to add status details (524), then conversion component inputs notes related to the object status (526) and updates the index file (528). If the user wants to group objects (530), conversion component 500 arranges groups on the pasteboard in accordance with the users direction (532) and updates index file 260 (534). If the user wants to display an index (536), conversion component 500 displays an index table (538) and updates pasteboard working file (540). If the user wants to stop (542), conversion component 500 saves index file 260 and all source document files 230 (544) and stops. If the user wants to continue, conversion component returns to step 512.

One embodiment of Electronic Pasteboard 200 allows users to perform Darwin Information Typing Architecture (DITA) analysis on the text of pasteboard working file 240 using DITA Analyzer 270 which uses a set of design principles to organize and categorize information contained in XML files. For example, using DITA, the author can automatically identify the lowest common structure element in the XML file (such as a paragraph or sentence), analyze the elements in the XML file based on a configurable attribute (such as types of speech or specific words), map the elements to the appropriate structure and report the results. DITA maps help authors avoid duplicate or inconsistent information within the same document. In addition, DITA analysis can be performed as part of Indexing Component 500 of Electronic Pasteboard 200, or can be performed separately. DITA is one known method of organizing and categorizing information contained in XML files. Other methods of analysis can be used by Electronic Pasteboard 200, such as IBMIDDOC or DOCBOOK.

Figure 6:
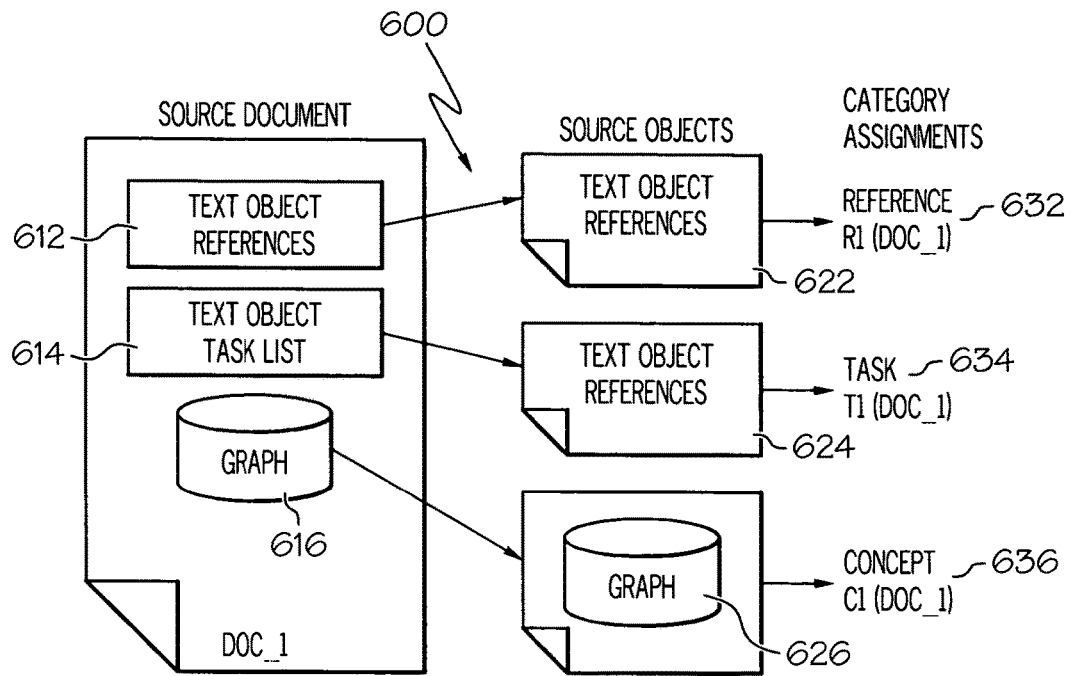
FIG. 6 depicts an example of document content categories.
Figure 7:
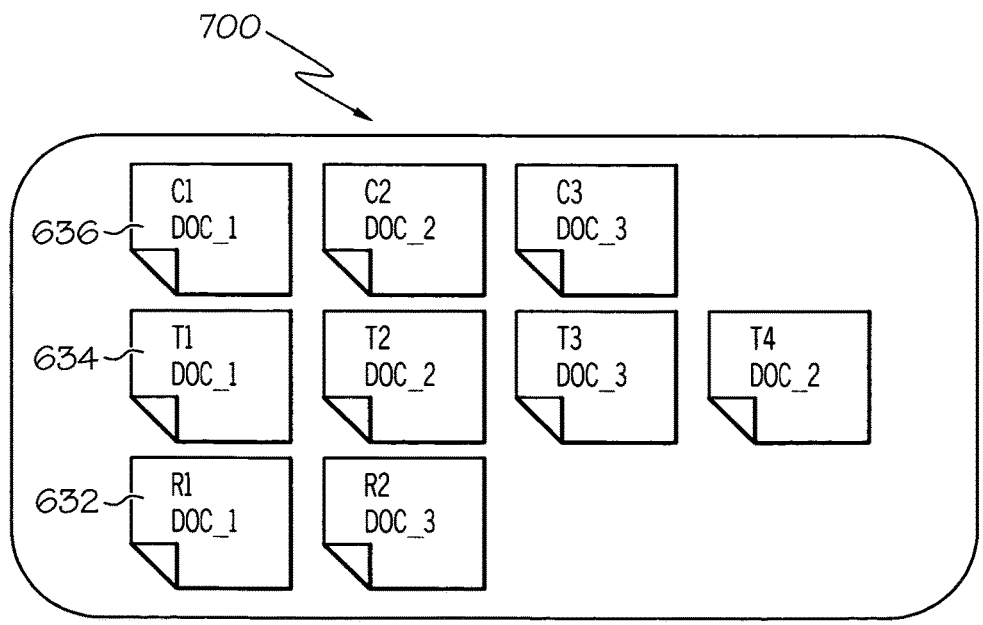
FIG. 7 depicts an example of document contents arranged by categories.

FIG. 6 depicts an example of document content categories which can be used to identify source objects and category assignments. In the example of FIG. 6, a source document 600 contains three different sections comprising text objects: references 612, task list 614, and graph 616. Each section is copied to a separate file and assigned a category. In the example, text object references 612 in source document 600 is copied to test object references file 622 and assigned to a category "reference" which has the symbol R1. If text object reference 622 is the first document assigned to the reference category, the symbol for text object reference 622 will be R1(DOC_1) (632). Each additional file in the reference category will have be DOC_2, DOC_3 and so on. In like manner, text object task list 614 will be copied to text object task list file 624 and assigned the designator T1(DOC_1) (634). Graph 616 will be assigned to graph file 626 and assigned a category concept so that the designator for the file will be C1(DOC_1) (636), FIG. 7 depicts an example of document contents arranged by categories. Thus a user will be able to access the document sections of multiple documents by accessing the symbol for the category and document. For example, the first file in the first row is C1 DOC_1 636. By clicking on or otherwise activating the icon C1 DOC_1 636, the user will be able to retrieve graph 626 (see FIG. 6). Activating T1 DOC_1 634 will retrieve text object task list 624, and activating R1 DOC_1 632 will retrieve text object reference 622 (See FIG. 6). In this way various source objects can be selected and arranged for placement in a new document. Further, selection buttons may be displayed so that individual source objects may be selected or source objects may be selected by category or by row. Source objects can also be displayed by relationship, i.e. by concepts, tasks, and reference topics that support or relate to each other.

Figure 8:
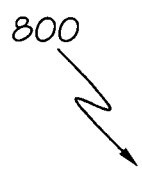
FIG. 8 depicts a table showing the status of document contents by category

FIG. 8 depicts table 800 showing an alternate way to display a plurality of source objects. In table 800 source objects are displayed in columns under each category and may be further subdivided by designators such as color designators. In the example, rows green, yellow, and red are used to subdivide the documents within each category. Further, selection buttons may be displayed so that individual source objects may be selected or source objects may be selected by category (concept, task or reference) or by row (green, yellow or red). For example, clicking the selector button for the yellow row would retrieve C3 (DOC_3), T1 (DOC_2), and T3 (DOC_3). Clicking the selector button for the red row would retrieve T4 (DOC 2).

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer implemented process for authoring documents, the computer implemented process comprising:
   displaying in a computer a graphical user interface for authoring documents;
   opening different source documents inside the graphical user interface;
   arranging each of the source documents on the graphical user interface;
   selecting different source objects contained in one or more of the different source documents;
   categorizing each of the selected different source objects into one of several different groups;
   assigning a meta tag to each of the selected different source objects, the meta tag indicating both a category of a corresponding one of the selected different source objects and also an identifier of corresponding one of the one or more of the different source documents containing the corresponding one of the selected different source objects;
   displaying in a selection table organized by unique categories and unique rows, different symbols in the graphical user interface, each as a selection button, each position in the selection table corresponding to one of the unique categories and one of the unique rows, each associated with a different meta tag assigned to a corresponding one of the different source objects; and
   on condition of detecting a selection in the table of one of the different symbols, retrieving into the graphical user interface a corresponding one of the different source objects and on condition of detecting a selection of one of the unique categories, retrieving into the graphical user interface all corresponding ones of the different source objects organized in the table according to the selected one of the unique categories, and on condition of detecting a selection of one of the unique rows, retrieving into the graphical user interface all corresponding ones of the different source objects organized in the table according to the selected one of the unique rows.

2. The computer implemented process of claim 1, further comprising defining a status for each of the selected source objects.

3. The computer implemented process of claim 2, further comprising displaying in the table a status of each of the selected source objects.

4. The computer implemented process of claim 1, further comprising analyzing the selected source objects using a set of design principles to organize and categorize information.

5. The computer implemented process of claim 4, wherein the analysis utilizes Darwin Information Typing Architecture for analyzing the content.

6. A computing system for authoring documents, the computing system comprising:
   a hardware processor;
   a computer memory connected to the hardware processor;
   different source documents in the computer memory;
   a graphical user interface program in the computer memory operable to
      display a graphical user interface for authoring documents,
      open the different source documents inside the graphical user interface,
      arrange the source documents visually on the graphical user interface,
      allow users to select different source objects contained in one or more of the different source documents,
      categorize each of the different source objects into one of several different groups,
      assign a meta tag to each of the selected different source objects in the group, the meta tag indicating both a category of a corresponding one of the selected different source objects and also an identifier of a corresponding one of the one or more of the different source documents containing the corresponding one of the selected different source objects,
      display in a selection table organized by unique categories and unique rows, different symbols in the graphical user interface, each as a selection button, each position in the selection table corresponding to one of the unique categories and one of the unique rows, each associated with a different meta tag assigned to a corresponding one of the different source objects, and
      on condition of detecting a selection in the table of one of the different symbols, retrieving into the graphical user interface a corresponding one of the different source objects and on condition of detecting a selection of one of the unique categories, retrieving into the graphical user interface all corresponding ones of the different source objects organized in the table according to the selected one of the unique categories, and on condition of detecting a selection of one of the unique rows, retrieving into the graphical user interface all corresponding ones of the different source objects organized in the table according to the selected one of the unique rows.

7. A computer hardware storage medium storing a plurality of instructions that when executed in memory of a computer cause the computer to perform:
   displaying in a computer a graphical user interface for authoring documents;
   opening different source documents inside the graphical user interface;
   arranging each of the source documents on the graphical user interface;
   selecting different source objects contained in one or more of the different source documents;

categorizing each of the selected different source objects into one of several different groups;

assigning a meta tag to each of the selected different source objects, the meta tag indicating both a category of a corresponding one of the selected different source objects and also an identifier of corresponding one of the one or more of the different source documents containing the corresponding one of the selected different source objects;

displaying in a selection table organized by unique categories and unique rows, different symbols in the graphical user interface, each as a selection button, each position in the selection table corresponding to one of the unique categories and one of the unique rows, each associated with a different meta tag assigned to a corresponding one of the different source objects; and on condition of detecting a selection in the table of one of the different symbols, retrieving into the graphical user interface a corresponding one of the different source objects and on condition of detecting a selection of one of the unique categories, retrieving into the graphical user interface all corresponding ones of the different source objects organized in the table according to the selected one of the unique categories, and on condition of detecting a selection of one of the unique rows, retrieving into the graphical user interface all corresponding ones of the different source objects organized in the table according to the selected one of the unique rows.

* * * * *